US012318903B2

(12) United States Patent
Li

(10) Patent No.: US 12,318,903 B2
(45) Date of Patent: Jun. 3, 2025

(54) POWER TOOL AND HAMMER DRILL

(71) Applicant: Nanjing Chervon Industry Co., Ltd., Nanjing (CN)

(72) Inventor: Yang Li, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 203 days.

(21) Appl. No.: 17/985,512

(22) Filed: Nov. 11, 2022

(65) Prior Publication Data

US 2023/0191576 A1 Jun. 22, 2023

(30) Foreign Application Priority Data

Dec. 20, 2021 (CN) ......................... 202111559700.0

(51) Int. Cl.
*B25D 11/06* (2006.01)
*B25D 17/06* (2006.01)

(52) U.S. Cl.
CPC .............. *B25D 11/06* (2013.01); *B25D 17/06* (2013.01)

(58) Field of Classification Search
None
See application file for complete search history.

(56) References Cited

U.S. PATENT DOCUMENTS

| | | | | |
|---|---|---|---|---|
| 9,102,044 B2 * | 8/2015 | Hartmann | .............. | B25D 17/06 |
| 2008/0271905 A1 * | 11/2008 | Yoshikane | ........... | B25D 16/006 173/109 |

FOREIGN PATENT DOCUMENTS

| | | | | |
|---|---|---|---|---|
| CN | 107627263 A | 1/2018 | | |
| CN | 212706596 U | 3/2021 | | |
| EP | 1584422 A1 * | 10/2005 | ........... | B25D 11/125 |
| EP | 1584422 B1 | 10/2008 | | |
| EP | 1607187 B1 | 4/2010 | | |
| EP | 3789161 A1 | 3/2021 | | |

* cited by examiner

*Primary Examiner* — Tanzim Imam
(74) *Attorney, Agent, or Firm* — Greenberg Traurig, LLP

(57) ABSTRACT

A power tool includes a motor, a drive mechanism, and an impact mechanism. The drive mechanism is capable of driving a tip functional element to rotate about an output axis. The impact mechanism is capable of abutting against the tip functional element and capable of driving the tip functional element. The impact mechanism includes an impact rod, an impact power piece, and an impact block. The impact rod abuts against the tip functional element. The impact power piece is used for generating impact power. The impact block is disposed between the impact rod and the impact power piece, capable of forming a gas space with the impact power piece, and capable of reciprocating when impacted by the impact power generated by the impact power piece. A minimum length of the gas space in a direction of the output axis is less than or equal to 13 mm.

18 Claims, 11 Drawing Sheets

POWER TOOL AND HAMMER DRILL

RELATED APPLICATION INFORMATION

This application claims the benefit under 35 U.S.C. § 119(a) of Chinese Patent Application No. CN 202111559700.0, filed on Dec. 20, 2021, which application is incorporated herein by reference in its entirety.

BACKGROUND

As a widely used power tool, a hammer drill is mainly used for opening holes on hard materials such as concrete, bricks and stones, that is, the hammer drill can output an impact force while outputting torque. Generally, an impact frequency is increased so that the working efficiency of the hammer drill can be improved, but the stability of the tool is affected.

SUMMARY

In one example, a hammer drill is configured to perform a hammer drilling operation through a tip functional element. The hammer drill includes a motor, a drive mechanism for generating a driving force, an output mechanism for accommodating at least a portion of the tip functional element and capable of being driven by the drive mechanism to drive the tip functional element to rotate about an output axis, and an impact mechanism capable of being driven by the drive mechanism to impact the tip functional element. The output axis extends along a front and rear direction of the hammer drill. The impact mechanism includes an impact rod capable of abutting against the tip functional element, an impact power piece connected to the drive mechanism and used for generating impact power, and an impact block disposed between the impact rod and the impact power piece and capable of reciprocating when impacted by the impact power generated by the impact power piece to impact the impact rod. A gas space is formed between the impact block and the impact power piece. A minimum length of the gas space in a direction of the output axis is less than or equal to 13 mm.

In one example, the impact power piece includes a cylinder, the cylinder is a semi-closed cavity with an end open, a rear end of the cylinder is closed and connected to the drive mechanism and a front end of the cylinder is open and used for accommodating the impact block along the direction of the output axis, the impact block is partially or fully accommodated in the cylinder, and a rear end surface of the impact block and an inner wall of the cylinder are capable of forming the gas space.

In one example, the output mechanism includes a sleeve, the sleeve is a cylindrical cavity with two ends open, the impact power piece includes a piston disposed within the sleeve and a connecting member, a front end of the connecting member is fixed to the piston and a rear end of the connecting member is connected to the drive mechanism, the impact block is accommodated within the sleeve, and a rear end surface of the impact block, an inner sidewall of the sleeve, and a front end surface of the piston are capable of forming the gas space.

In one example, the minimum length of the gas space in the direction of the output axis is less than or equal to 10 mm.

In one example, the minimum length of the gas space in the direction of the output axis is less than or equal to 11 mm.

In one example, the minimum length of the gas space in the direction of the output axis is less than or equal to 12 mm.

In one example, a weight of the impact block is greater than or equal to 50 g and less than or equal to 100 g.

In one example, a weight of the impact block is greater than or equal to 50 g and less than or equal to 70 g.

In one example, a length of the impact block is greater than or equal to 20 mm and less than or equal to 40 mm.

In one example, a length of the impact block is greater than or equal to 25 mm and less than or equal to 30 mm.

In one example, the hammer drill has an impact work of greater than or equal to 4.5 J.

In one example, a weight of the hammer drill is less than or equal to 6 kg.

In one example, a weight of the hammer drill is less than or equal to 4 kg.

In one example, an impact frequency of the impact mechanism is greater than or equal to 4500 BPM.

In one example, an impact frequency of the impact mechanism is greater than or equal to 4600 BPM.

In one example, a hammer drill is configured to perform a tool operation through a tip functional element. The functional element is mounted to the hammer drill in a mounting direction. The hammer drill includes a motor, an impact mechanism including an impact power piece for generating impact power, and an impact block capable of reciprocating a drive mechanism capable of driving the impact mechanism. A gas space is provided between a rear end of the impact block and the impact power piece. A length of the gas space in a direction of the mounting direction is less than or equal to 13 mm when the impact block is at an impact position.

In one example, a power tool is configured to perform a tool operation through a tip functional element. The power tool includes a motor, an impact mechanism capable of abutting against the tip functional element and capable of impacts the tip functional element along an output axis, and a drive mechanism capable of driving the impact mechanism. The output axis extends along a front and rear direction of the power tool. The impact mechanism includes an impact rod capable of abutting against the tip functional element, an impact power piece connected to the drive mechanism and used for generating impact power, and an impact block disposed between the impact rod and the impact power piece, capable of forming a gas space with the impact power piece, and capable of reciprocating when impacted by the impact power generated by the impact power piece to reciprocatingly impact the impact rod. A minimum length of the gas space in a direction of the output axis is less than or equal to 13 mm, and an impact frequency of the impact mechanism is greater than or equal to 4500 BPM.

In one example, the impact power piece includes a cylinder, and the cylinder is a semi-closed cavity with an end open; wherein along the direction of the output axis, a rear end of the cylinder is closed and connected to the drive mechanism, and a front end of the cylinder is open and used for accommodating the impact block; and wherein the impact block is partially or fully accommodated in the cylinder, and a rear end surface of the impact block and an inner wall of the cylinder are capable of forming the gas space.

In one example, the power tool further includes a sleeve. The sleeve is a cylindrical cavity with two ends open, the impact power piece includes a piston disposed within the sleeve, a rear end of the piston is connected to the drive mechanism, the impact block is accommodated within the sleeve, and a rear end surface of the impact block, an inner sidewall of the sleeve and a front end surface of the piston are capable of forming the gas space.

In one example, the minimum length of the gas space in the direction of the output axis is less than or equal to 10 mm.

DETAILED DESCRIPTION

Examples of the present disclosure are described below with reference to the drawings. Further, in the following examples, a hammer drill is shown as one example of a power tool configured to work by driving a tip functional element. The hammer drill is configured to enable the tip functional element mounted on the tool to impact a workpiece along a direction of an output axis or rotate about the direction of the output axis or perform the preceding two actions at the same time.

First, an overall structure of the hammer drill is described. To clearly illustrate the technical solution of the present application, up, down, front, and rear are defined as shown in FIGS. 1 and 4.

Figure 1:
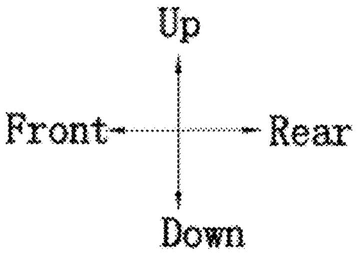
FIG. 1 is a structural view of a hammer drill according to an example of the present disclosure.
Figure 1:
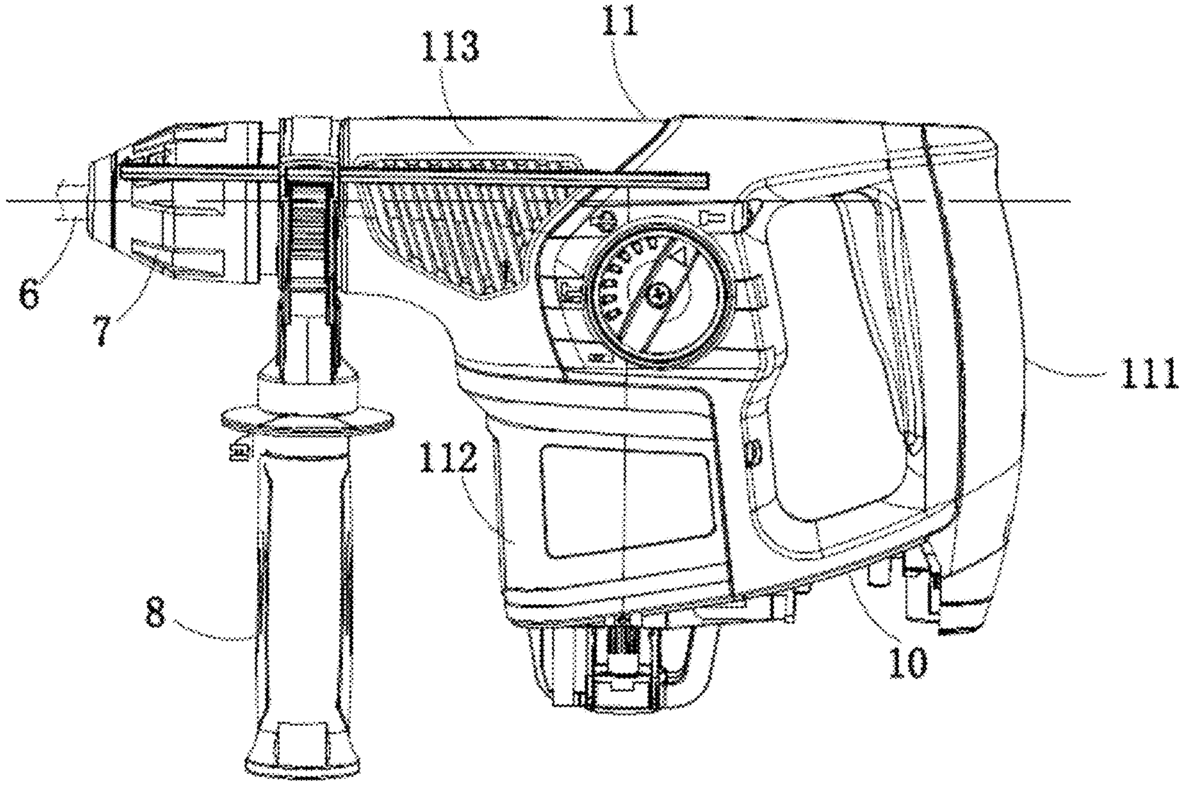
Figure 4:
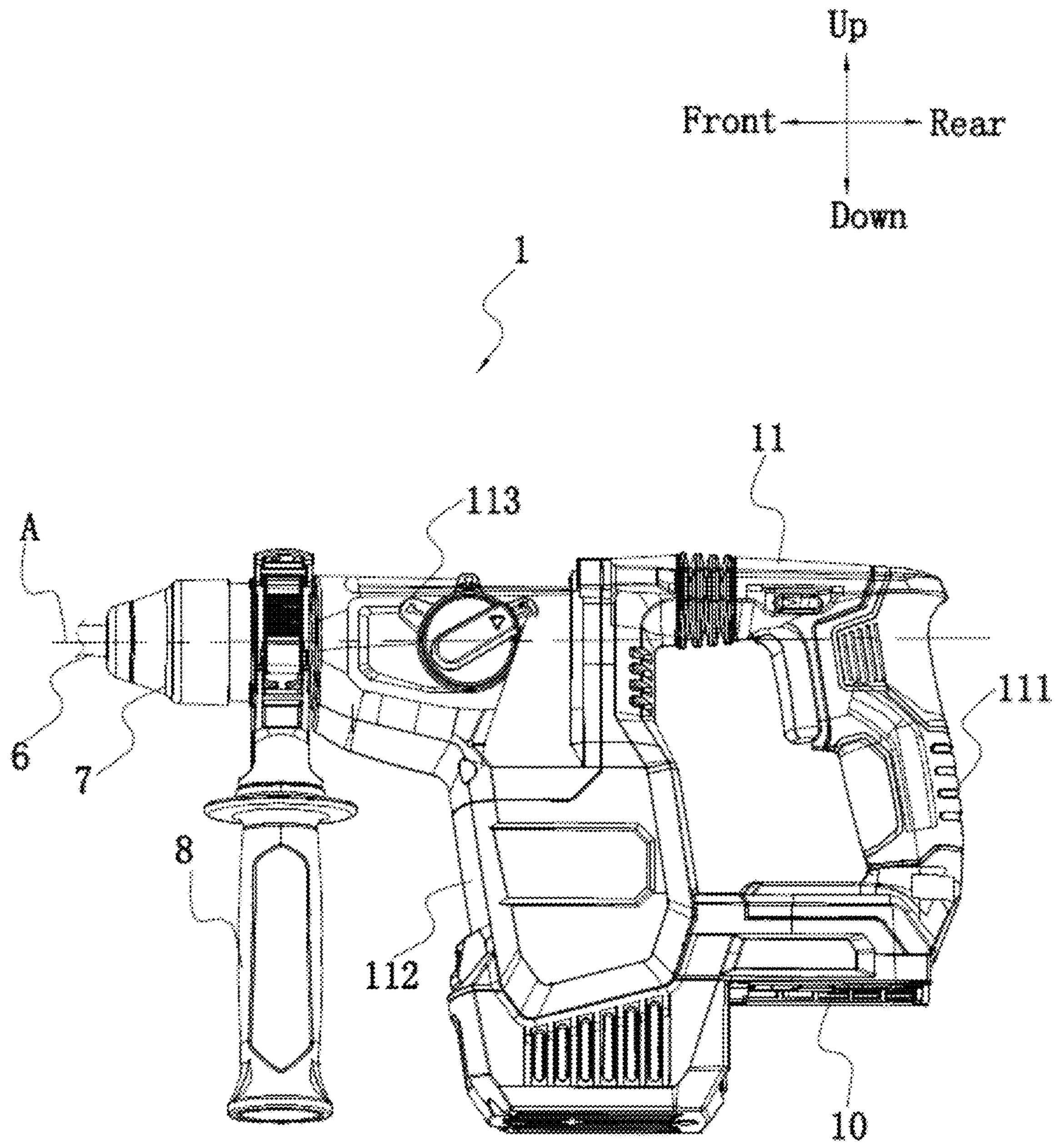
FIG. 4 is a structural view of a hammer drill according to an example of the present disclosure.

As shown in FIGS. 1 and 4, an outer contour of the hammer drill 1 is mainly composed of a housing 11 formed with a grip 111, and an accommodating space capable of containing various functional components is formed inside the housing 11.

As shown in FIGS. 1 to 4, the hammer drill 1 mainly includes the housing 11, a power supply interface 10, a motor 2, a drive mechanism 3, an impact mechanism 4, and an output mechanism 5. In an example, the power supply interface 10 can access a battery pack, and the battery pack may be inserted into or separated from the housing 11, that is, the battery pack is not directly mounted on a surface of the housing 11. The specific mounting manner of the battery pack is not limited as long as a power source can be provided. In an example, the power supply interface 10 can access alternating current mains power.

In this example, a weight of the hammer drill 1 is less than or equal to 6 kg. For example, the weight of the hammer drill 1 is 6 kg, 5.5 kg, or 5 kg. In this example, the weight of the hammer drill 1 is less than or equal to 4 kg. In this example, the hammer drill 1 has an impact work of greater than or equal to 4.5 J. For example, the hammer drill 1 has an impact work of 5 J, 6 J, 10 J, 15 J, or the like.

The housing 11 is formed with the grip 111 for a user to hold, a first accommodating portion 112 accommodating the motor 2 and the drive mechanism 3, and a second accommodating portion 113 accommodating the impact mechanism 4 and the output mechanism 5. As shown in FIGS. 1 and 4, an output axis A is defined to more clearly illustrate design positions of different structures. In an example, the output axis A and a straight line on which a mounting direction of a tip functional element 6 is located are basically parallel to each other or are the same straight line, the second accommodating portion 113 extends along the direction of the output axis A, and the first accommodating portion 112 and the second accommodating portion 113 are integrally formed to be substantially L-shaped in a side view. In an example, the first accommodating portion 112 may extend along the direction of the output axis A, and the first accommodating portion and the second accommodating portion 113 are integrally formed to be substantially rectangular in a side view.

The motor 2 includes a motor body 21 and a motor shaft 22. An included angle between a motor axis B on which the motor shaft 22 is located and the output axis A is greater than or equal to 0° and less than or equal to 180°. In an example, the included angle between the motor axis B and the output axis A is approximately 90°. In an example, the motor axis B is basically parallel to the output axis A.

The output mechanism 5 includes a sleeve 51, where the sleeve 51 can be driven by the drive mechanism 3 to rotate about the output axis A. Specifically, the sleeve 51 is formed with an accommodating cavity for accommodating the tip functional element 6, where the tip functional element 6 may be inserted into the accommodating cavity. A clamping assembly 7 may retain the tip functional element 6 within the sleeve 51. When the sleeve 51 rotates about the output axis A, the tip functional element 6 can be driven to rotate. In an example, a sleeve driving wheel 52 is fixed to an outer side of the sleeve 51 and can be driven by the drive mechanism 3 to drive the sleeve 51 to rotate.

The impact mechanism 4 can be driven by the drive mechanism 3 to drive the tip functional element 6 to strike the workpiece along the direction of the output axis A. In this example, the impact mechanism 4 includes an impact rod 41, an impact block 42, and an impact power piece 43. The impact rod 41 can abut against the tip functional element 6. That is to say, after inserted into the sleeve 51 from the front to the rear along the direction of the output axis A, the tip functional element 6 can be in contact with a front end surface of the impact block 42. A position of the impact rod 41 within the sleeve 51 is basically unchanged. The impact block 42 is disposed at a rear end of the impact rod 41 and can be pushed by impact power to reciprocatingly impact the impact rod 41 from the rear to the front along the direction of the output axis. When the impact block 42 is at an impact position shown in FIG. 3, the impact rod 41 can transmit an impact force to the tip functional element 6 so that the tip functional element 6 performs an impact action on a workpiece. The impact power piece 43 is disposed behind the impact block 42, and an end of the impact power piece 43 is connected to the drive mechanism 3 and can be driven by the drive mechanism 3 to generate the impact power.

In this example, a weight of the impact block 42 is greater than or equal to 50 g and less than or equal to 100 g. In some examples, the weight of the impact block 42 is greater than or equal to 50 g and less than or equal to 70 g. For example, the weight of the impact block 42 is 50 g, 55 g, 60 g, 70 g, or the like. In this example, a length of the impact block 42 is greater than or equal to 20 mm and less than or equal to 40 mm. In some examples, the length of the impact block 42 is greater than or equal to 25 mm and less than or equal to 30 mm. For example, the length of the impact block 42 is 25 mm, 26 mm, 27 mm, 28 mm, 29 mm, 30 mm, or the like.

In this example, a gas space 44 can be formed between the impact block 42 and the impact power piece 43. The impact power piece 43, when driven by the drive mechanism 3, can compress the gas in the gas space 44, causing the gas pressure in the gas space 44 to increase and thereby generating the impact power. That is to say, when driven by the drive mechanism 3, the impact power piece 43 can move from the rear to the front along the direction of the output axis A to compress the gas in the gas space 44, and correspondingly, the size of the gas space 44 changes. When the gas pressure in the gas space 44 is high enough, the impact block 42 can be pushed to impact towards the impact rod 41. Specifically, as the impact power piece 43 moves from the rear to the front, a length of the gas space 44 along the direction of the output axis A continuously decreases, and when the impact block 42 impacts the impact rod 41, the impact block 42 moves to the impact position. When the impact block 42 is at the impact position, the gas space 44 has a minimum length along the direction of the output axis A, where a minimum length D is less than or equal to 13 mm. For example, the minimum length of the gas space 44 is 13 mm, 12 mm, 11 mm, 10 mm, or the like.

The drive mechanism 3 is disposed in the first accommodating portion 112 and can drive the output mechanism 5 to drive the tip functional element 6 to perform a drilling operation or drive the impact mechanism 4 to drive the tip functional element 6 to perform an impact operation or drive the output mechanism 5 and the impact mechanism 4 simultaneously to cause the tip functional element 6 to perform a hammer drilling operation. In an optional example, the drive mechanism 3 may selectively control the output mechanism 5 or the impact mechanism 4 in cooperation with other clutch structures or control structures or switching structures, the specific implementation of which is not described in detail in this example.

Figure 2:
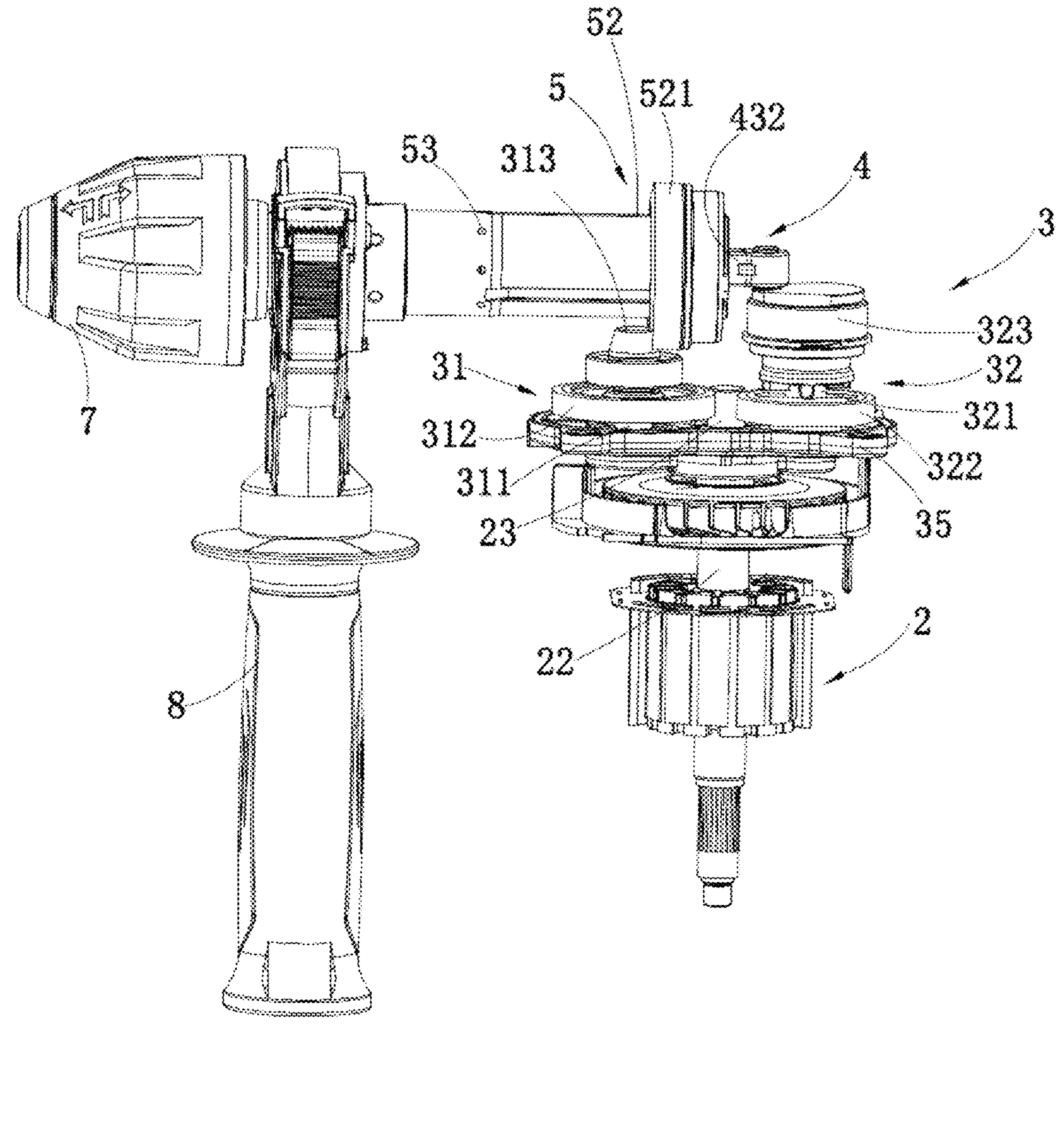
FIG. 2 is a view of part of an internal structure of the hammer drill shown in FIG. 1 with a housing removed.
Figure 3:
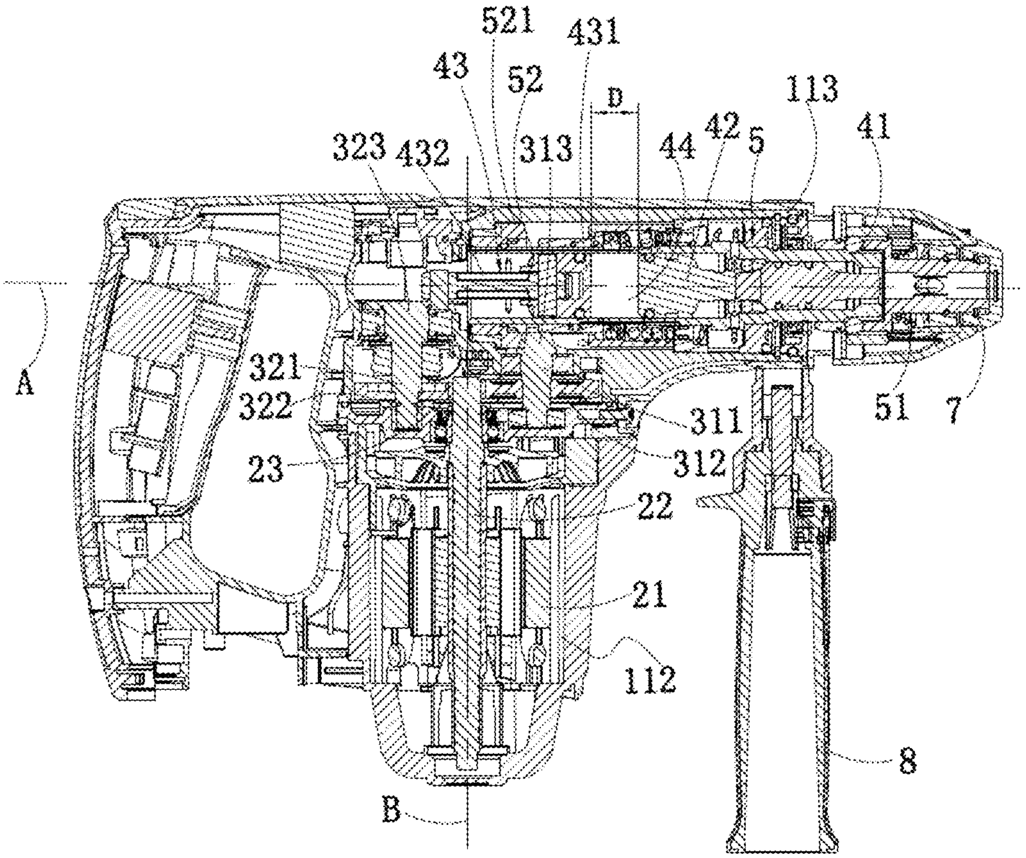
FIG. 3 is a sectional view of the hammer drill shown in FIG. 1.

In an example, the drive mechanism 3 includes a first drive assembly 31 and a second drive assembly 32. The first drive assembly 31 is used for driving the output mechanism 5 and the second drive assembly 32 is used for driving the impact mechanism 4. Referring to FIGS. 2 and 3, the first drive assembly 31 includes a first drive shaft 311, a first transmission gear 312, and a first drive gear 313, and the second drive assembly 32 includes a second drive shaft 321, a second transmission gear 322, and a swing link bearing 323. The first drive shaft 311 is approximately parallel to the motor shaft 22 and the second drive shaft 321 in a vertical direction. A first motor transmission gear 23 is disposed on the motor shaft 22 and can be engaged with the first transmission gear 312 and the second transmission gear 322 separately. The rotation of the motor 2 can drive the rotation of the first motor transmission gear 23, the first motor transmission gear 23 drives the first transmission gear 312 and the second transmission gear 322 to rotate, and then the first transmission gear 312 drives the first drive shaft 311 to rotate and the second transmission gear 322 drives the second drive shaft 321 to rotate. Further, the rotation of the first drive shaft 311 can drive the rotation of the first drive gear 313. Since the first drive gear 313 is engaged with a first sleeve driving wheel 521 fixed outside the sleeve 51, the first sleeve driving wheel 521 can drive the sleeve 51 to rotate so that the tip functional element 6 can perform the drilling operation. In addition, the rotation of the second drive shaft 321 can drive the swing link bearing 323 to swing reciprocatingly along a front and rear direction. Since the swing link bearing 323 is connected to the impact power piece 43, the impact power piece 43 can generate the impact power so that the tip functional element 6 performs an impact action along the direction of the output axis A. In an example, the first drive gear 313 is a bevel gear, and the first sleeve driving wheel 521 fixed outside the sleeve 51 can be engaged with the bevel gear, thereby changing a transmission direction.

In an embodiment, a support 35 is further included and disposed on the motor shaft 22 and can support the first drive assembly 31 and the second drive assembly 32 at an upper end of the motor 2.

Referring to FIGS. 2 and 3, the impact power piece 43 includes a piston 431 and a connecting member 432, where the connecting member 432 is fixed to the piston 431, a front end of the connecting member 432 is fixed to the piston 431, and a rear end of the connecting member 432 is connected to the swing link bearing 323. Therefore, when the second drive shaft 321 rotates to drive the swing link bearing 323 to swing reciprocatingly along the front and rear direction, the connecting member 432 can drive the piston 431 to reciprocate within the sleeve 51. It is to be understood that when a swing link on the swing link bearing 323 is closest to the sleeve 51, the piston 431 is farthest from a rear end of the sleeve 51; and when the swing link on the swing link bearing 323 is farthest from the sleeve 51, the piston 431 is closest to the rear end of the sleeve 51. During the forward movement of the piston 431 away from the rear end of the sleeve 51, the gas in the gas space 44 is compressed and the gas pressure increases so that the impact block 42 can be pushed to impact forward to the impact position. As the piston 431 moves towards the rear end of the sleeve 51, the gas pressure in the gas space 44 gradually decreases, resulting in negative pressure, so that the impact block 42 moves backwards away from the impact position. The preceding process is a process in which the impact mechanism 4 performs one impact action and is reset. In this example, a rear end surface of the impact block 42, an inner sidewall of the sleeve 51, and a front end surface of the piston 431 can form the preceding gas space 44. Optionally, the preceding gas space 44 may be a closed space or a non-closed space. For example, a gas hole 53 is provided on a wall of the sleeve 51 and can provide a passage for gas exchange between the gas space 44 and the space outside the sleeve 51 during the movement of the piston 431, which can solve the problem of serious heat generation caused by multiple reciprocating movements of the piston 431.

In an example, the structure of a hammer drill is shown in FIGS. 4 to 7. Main differences between the hammer drill shown in FIGS. 4 to 7 and the hammer drill shown in FIGS. 1 to 3 lie in the drive mechanism 3 and an impact mechanism 4. Therefore, in this example, other structures are not described in detail. FIGS. 4 to 7 follow the reference numerals in FIGS. 1 to 3, that is, the same parts use the same reference numerals.

Figure 5:
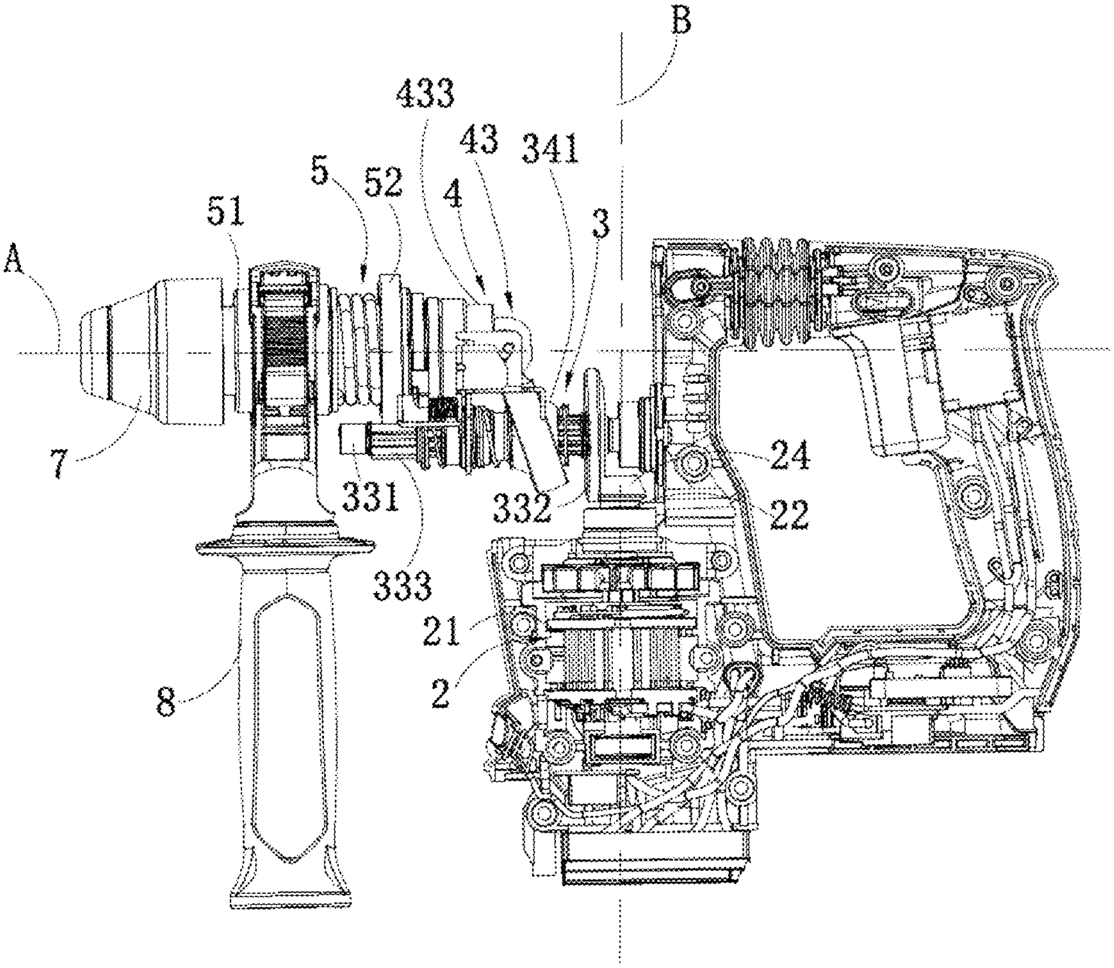
FIG. 5 is a view of part of an internal structure of the hammer drill shown in FIG. 4 with a housing removed.
Figure 6:
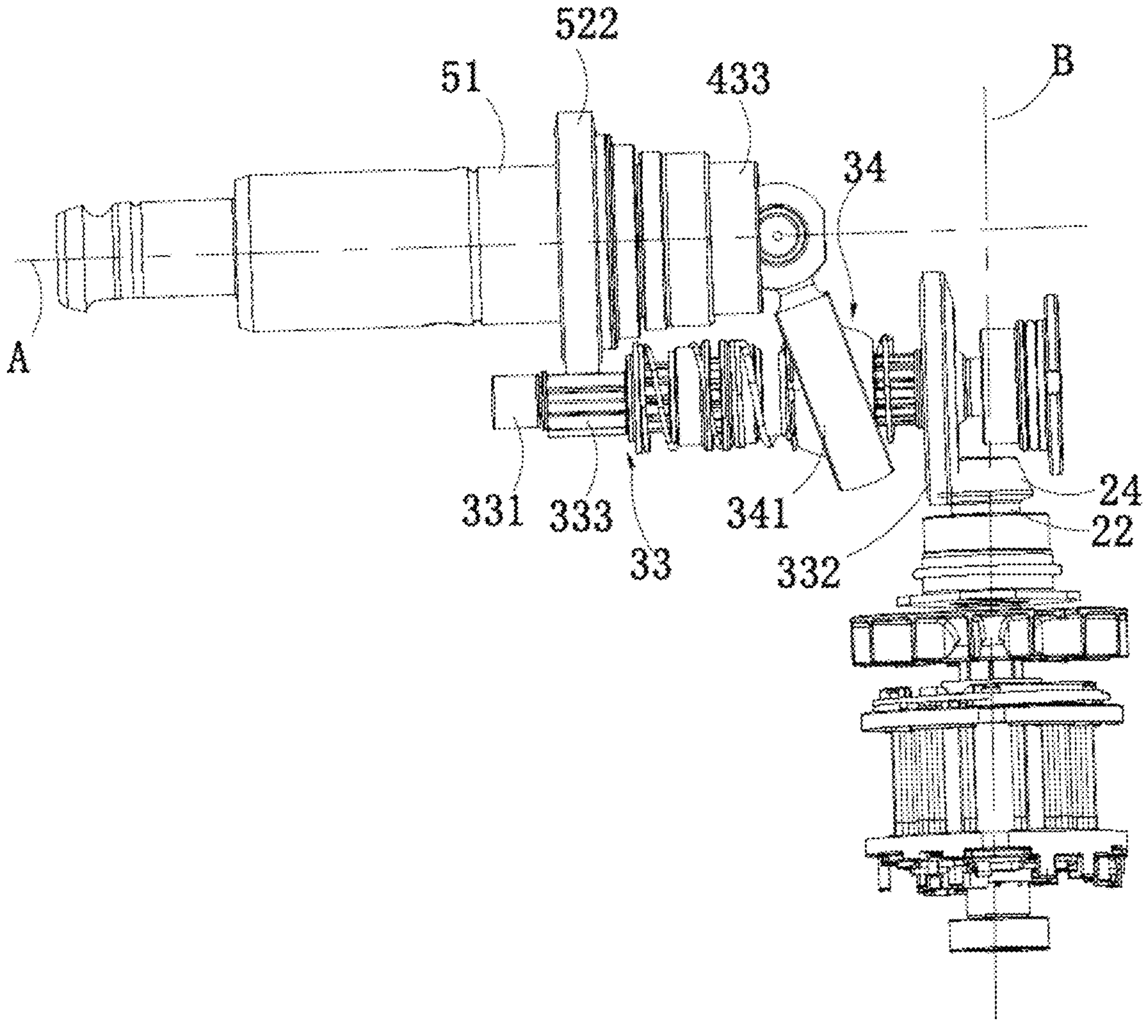
FIG. 6 is a view of part of an internal structure of the hammer drill shown in FIG. 4 with a housing removed.
Figure 7:
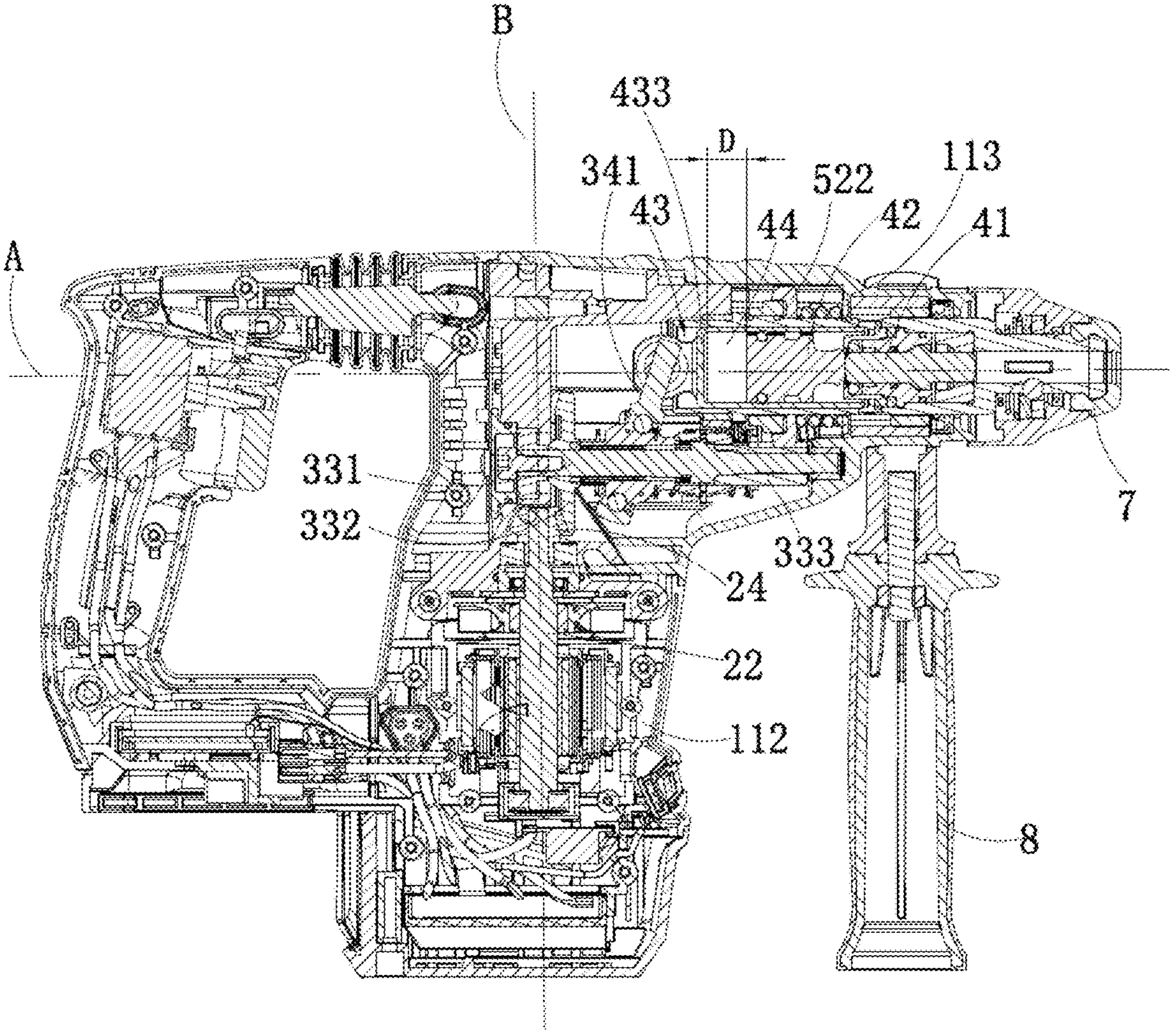
FIG. 7 is a sectional view of the hammer drill shown in FIG. 4.

In this example, the drive mechanism 3 includes a third drive assembly 33 and a fourth drive assembly 34. The third drive assembly 33 is used for driving the output mechanism 5 and the fourth drive assembly 34 is used for driving the impact mechanism 4. Referring to FIGS. 5 to 7, the third drive assembly 33 includes a third drive shaft 331, a third transmission gear 332, and a third drive gear 333, and the fourth drive assembly 34 includes a crank rocker 341 disposed on the third drive shaft 331. The crank rocker 341 is connected to the impact power piece 43 and can directly drive the impact power piece 43 to move. In this example, the third drive shaft 331 and the motor shaft 22 are integrally formed to be substantially perpendicular in a side view. A second motor transmission gear 24 is disposed at an upper end of the motor shaft 22 and can be engaged with the third transmission gear 332 on the third drive shaft 331 so that the third drive shaft 331 is driven to rotate when the motor rotates. In this example, the third transmission gear 332, the crank rocker 341, and the third drive gear 333 are disposed on the third drive shaft 331 from the rear to the front. After the third drive shaft 331 is driven to rotate, the crank rocker 341 is driven to reciprocate along the direction of the output axis A. Since the crank rocker 341 is connected to the impact power piece 43, the impact power piece 43 can generate the impact power so that the tip functional element 6 strikes the workpiece along the direction of the output axis A. The third drive gear 333 is engaged with a second sleeve driving wheel 522 fixed outside the sleeve 51 so that the sleeve 51 can be driven to rotate. In this example, the second motor transmission gear 24 is a bevel gear, and the third transmission gear 332 can be engaged with the bevel gear, thereby changing a transmission direction.

Referring to FIGS. 5 to 7, the impact power piece 43 includes a cylinder 433. The cylinder 433 is a semi-closed cavity with an end open. Specifically, along the direction of the output axis, a rear end of the cylinder 433 is closed and can be connected to the crank rocker 341, and a front end of the cylinder 433 is open and used for accommodating the impact block 42. In this example, the cylinder 433 is connected to the crank rocker, and when the crank rocker is driven to reciprocate along the direction of the output axis A, the cylinder 433 is driven to reciprocate. During the forward movement of the cylinder 433, the gas in the gas space 44 is compressed, the gas pressure increases, and when the gas pressure increases to a certain extent, the impact block 42 is pushed to impact forward to the impact position. During the backward movement of the cylinder 433, the gas pressure in the gas space 44 gradually decreases to a negative pressure, and the impact block 42 is driven to move backwards to leave the impact position. The preceding process is a process in which the impact mechanism 4 performs one impact action and is reset. In this example, the rear end surface of the impact block 42 and an inner wall of the cylinder 433 can form the gas space 44, where the inner wall of the cylinder 433 mainly includes a sidewall and an inner wall at the rear end of the cylinder 433. The preceding gas space 44 may be a closed space or a non-closed space. For example, the gas hole 53 is provided on the wall of the cylinder 433 and can provide a passage for gas exchange between the gas space 44 and the space outside the cylinder 433 during the movement of the cylinder 433, which can solve the problem of serious heat generation caused by multiple reciprocating movements of the cylinder 433.

In an example, the drive mechanism 3 shown in FIGS. 2 and 3 may operate in cooperation with the impact power piece 43 shown in FIGS. 5 to 7; and the impact power piece 43 shown in FIGS. 2 and 3 may operate in cooperation with the drive mechanism 3 shown in FIGS. 5 to 7. In the example of the present application, on the basis of ensuring that the gas space 44 exists between the impact power piece 43 and the impact block 42, other modified structures of the impact power piece 43 or the drive mechanism 3 may be used.

In an embodiment, a mounting position or angle of the swing link bearing 323, the crank rocker, or another structure may be adjusted so as to adjust the minimum length D of the gas space 44 between the impact block 42 and the impact power piece 43.

In the example of the present application, the minimum length D of the gas space 44 is configured to be less than or equal to 13 mm so that the intensity of the peak gas pressure or the average gas pressure in the gas space 44 in the working process of the tool can be enhanced and thus impact energy or the impact work can be increased. In addition, the magnitude of D is minimized so that a length of the entire machine of the tool along the front and rear direction is reduced to some extent and the dimension of the entire machine is shortened.

In an example, the hammer drill 1 working with a load has an impact frequency of greater than or equal to 4500 BPM. For example, the impact frequency is 4600 BPM, 4700 BPM, or the like.

In an example, the hammer drill 1 further includes a secondary handle 8. The secondary handle 8 is detachably mounted on a tool body.

Generally, the hammer drill 1 may work with a light load or work with a load, and impact frequencies of the tool in the two manners are different. The so-called working with a light load may be that the tool is in a light-load impact stage and has a light-load impact frequency when the impact rod 41 of the tool abuts against the workpiece and the tool starts working or that the tool can work with a light load and has the light-load impact frequency when the material of the workpiece is relatively soft. However, after the initial working of the tool or when the material of the workpiece is relatively hard, the tool works with a relatively large load and has a load impact frequency. It is to be understood that the light-load impact frequency of the tool is greater than the load impact frequency.

In the example of the present application, the hammer drill 1 can work at a constant speed or work at a non-constant speed. When the motor 2 in the tool works at a constant speed, an increase of a rotational speed or an increase of the impact frequency may result in an impact dead point. The so-called impact dead point means that the gas pressure in the gas space 44 at a rear end of the impact block 42 changes too fast due to too high an impact frequency and the negative pressure lasts for too short a time to suck the impact block 42 away from the impact position. When the motor 2 in the tool works at a non-constant speed, the impact frequency of the tool can be continuously increased. The light-load impact frequency is generally greater than or equal to 4500 BPM. When the impact frequency is continuously increased, the impact dead point may occur. To sum up, the increase of the impact frequency in the working process of the tool has a certain limit, which is a pain point for the tool to reach a higher impact velocity.

In the example of the present application, the minimum length D of the gas space 44 along the output axis A is reduced so that the impact dead point can be effectively avoided while the working efficiency of the hammer drill is improved.

In the process of the hammer drill 1 in FIGS. 1 to 3 working with a load, the impact energy that can be obtained when the minimum length D of the gas space 44 along the output axis A or the impact frequency is changed is shown in Table 1 below. Since impact efficiency is positively correlated to the impact energy and the impact frequency, the impact efficiency is high when the impact frequency is high and the impact energy is large.

TABLE 1

Figure 8A:
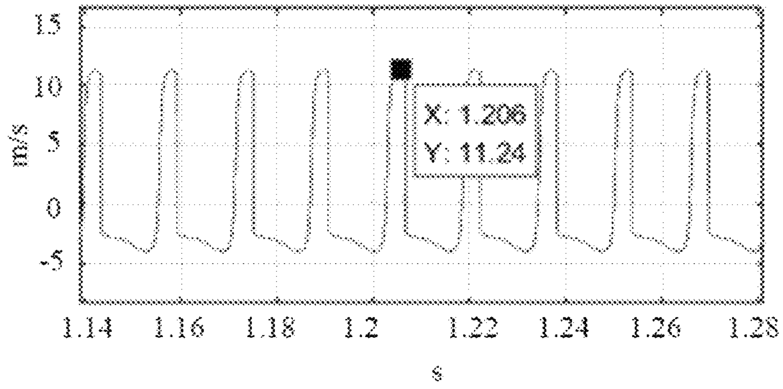
FIGS. 8A to 8C are impact velocity curves of an impact block in response to different parameter settings of the hammer drill shown in FIG. 1 working with a load.
Figure 8B:
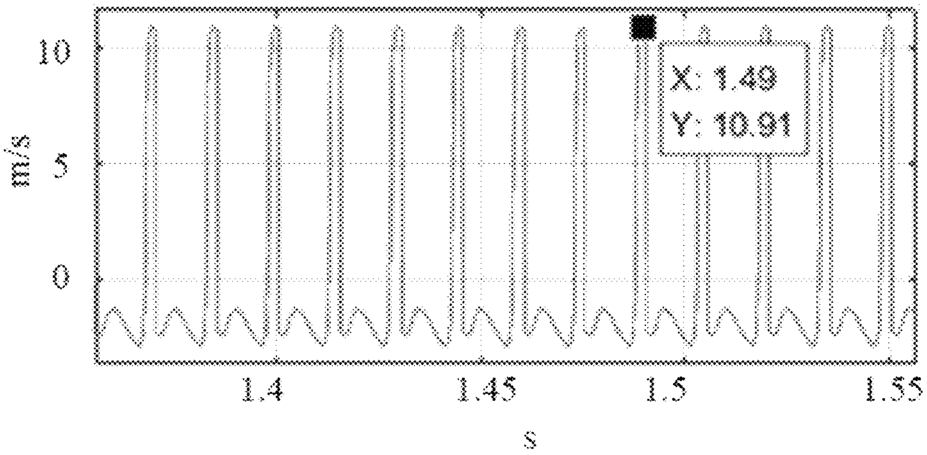
Figure 8C:
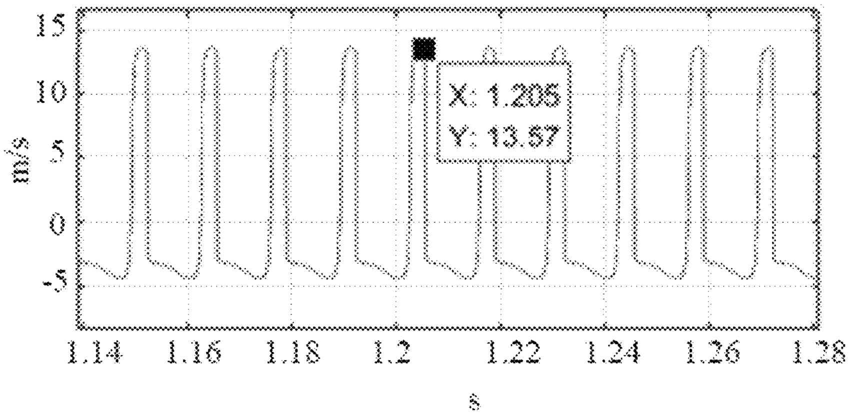

| Tool | Tool Common Parameter | D | Load Impact Frequency | Impact Velocity | Impact Energy |
|---|---|---|---|---|---|
| Tool A | X | 20 | 3800 | FIG. 8A | 7.28 J |
| Tool A1 | X | 10 | 3800 | FIG. 8B | 6.85 J |
| Tool A2 | X | 10 | 4500 | FIG. 8C | 10.66 J |

In Table 1, tool A1 and tool A2 are tools corresponding to different working parameters or component parameters after tool A is modified, separately. D is the minimum length of the gas space 44 along the output axis A; and the load impact frequency is the impact frequency at which the tool drills the workpiece. The tool common parameter may be one or more of a mass of the impact block, a crank radius, a rocker length, or a cylinder radius and may also be other parameters, which is not limited in the present application. The same tool common parameter is selected for tool A, tool A1, and tool A2 in Table 1 and is X, and the value or type of X is not described in detail herein.

As can be seen from the comparison of the second row with the third row in Table 1, when the impact frequency is relatively small and less than 4500 BPM and only a distance D is shortened, the impact energy obtained by tool A1 is not higher than and even slightly lower than the impact energy obtained by the original tool A whose parameter is not modified. As can be seen from the comparison of the third row with the fourth row in Table 1, on the basis of shortening the distance D, when the impact frequency increases to 4500 BPM, the impact energy can be greatly increased.

In the process of the hammer drill 1 in FIGS. 1 to 3 impacting a light load, the impact energy that can be obtained when the minimum length D of the gas space 44 along the output axis A or the impact frequency is changed is shown in Table 2.

Figure 9A:
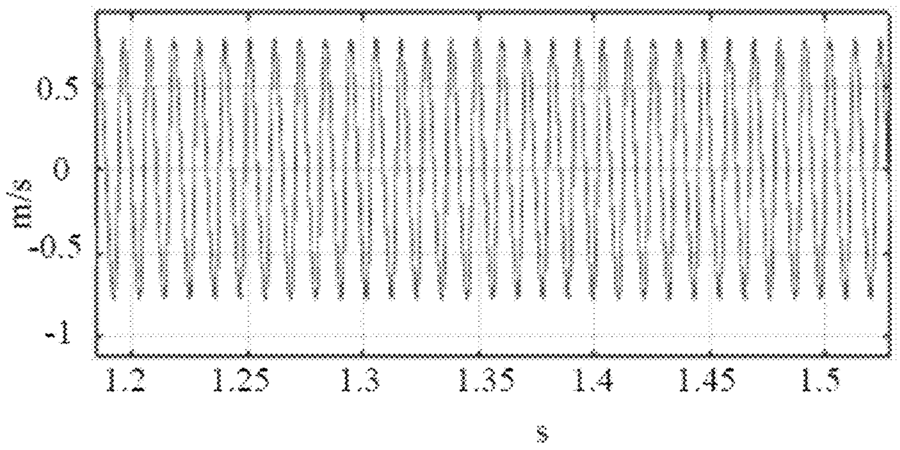
FIGS. 9A to 9C are impact velocity curves of an impact block in response to different parameter settings of the hammer drill shown in FIG. 1 working with a light load.

As shown in Table 2, when the tool has a light-load impact frequency of 5200 BPM, the velocity of the impact block 42 becomes very small as shown in FIG. 9A, and the impact dead point of the tool may occur. In this case, an increase of the impact frequency makes no sense. As shown in the third row of Table 2 and FIG. 9B, with the light-load impact frequency unchanged, the distance D is shortened so that the tool has a normal impact velocity and normal impact energy and can perform a normal impact without the impact dead point. As can be seen from the comparison of the second row with the third row of Table 2, when the light-load impact frequency is relatively high and reaches a critical value of the impact dead point, the distance D is shortened so that the tool can perform a normal impact. That is, the distance D is shortened so that the tool can reach a relatively high constant speed value when working at a constant speed or the tool can reach a relatively high impact frequency when working at a non-constant speed. As can be seen from the comparison of the third row with the fourth row of Table 2, when the distance D is shortened and the light-load impact frequency is increased, the tool can obtain relatively large impact energy and a relatively high impact velocity, thereby achieving relatively high impact efficiency.

TABLE 2

Figure 9B:
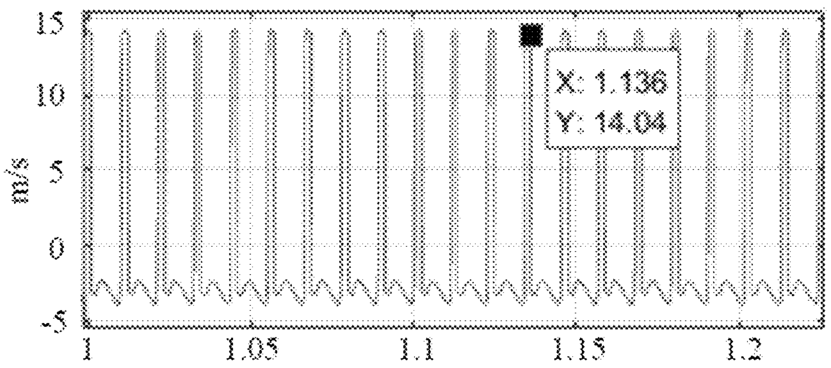
Figure 9C:
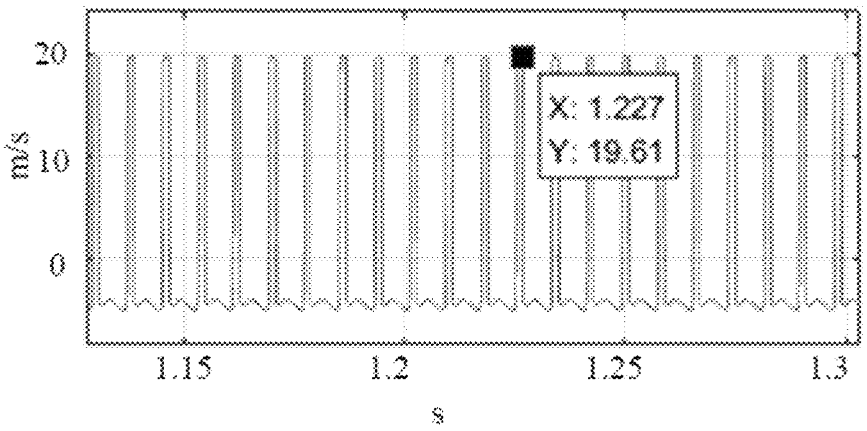

| Tool | Tool Common Parameter | D | Light-load Impact Frequency | Impact Velocity | Impact Energy |
|---|---|---|---|---|---|
| Tool A | X | 20 | 5200 | FIG. 9A | Make no sense |
| Tool A1 | X | 10 | 5200 | FIG. 9B | 11.78 J |
| Tool A2 | X | 10 | 7200 | FIG. 9C | 22 J |

As can be seen from the comparison of Table 1 with Table 2, when the distance D is less than 13 mm, for example, 10 mm, the tool can reach a relatively high impact frequency to obtain relatively large impact energy and thus achieve relatively high impact efficiency.

In the process of the hammer drill 1 in FIGS. 4 to 7 working with a load, the impact energy that can be obtained when the minimum length D of the gas space 44 along the output axis A or the impact frequency is changed is shown in Table 3. Since the impact efficiency is positively correlated to the impact energy and the impact frequency, the impact efficiency is high when the impact frequency is high and the impact energy is large.

TABLE 3

Figure 10A:
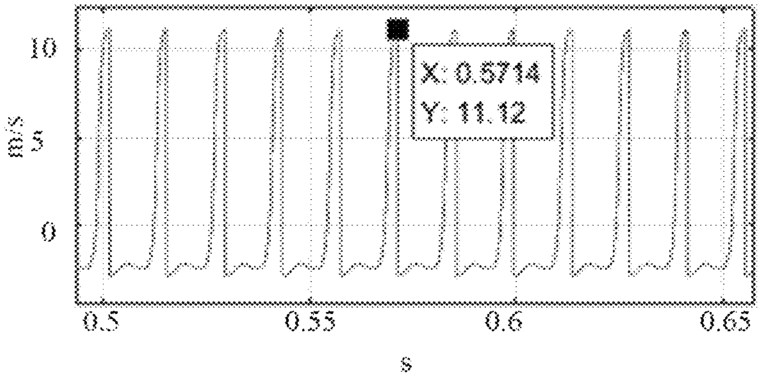
FIGS. 10A to 10C are impact velocity curves of an impact block in response to different parameter settings of the hammer drill shown in FIG. 4 working with a load.
Figure 10B:
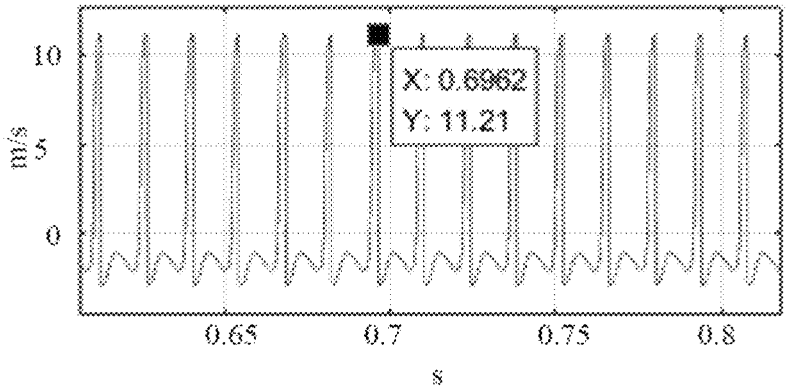
Figure 10C:
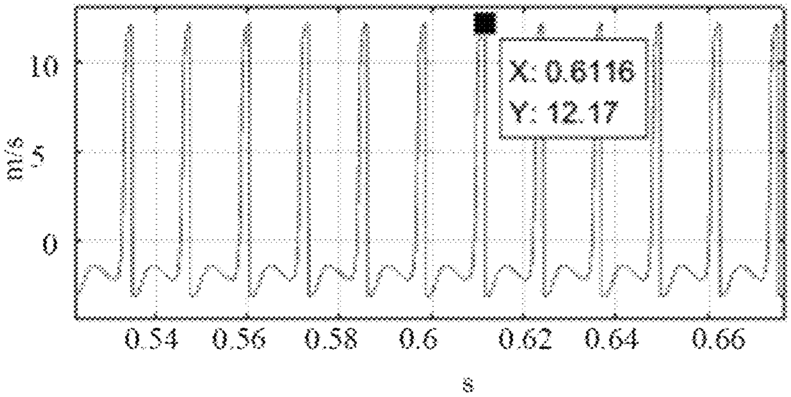

| Tool | Tool Common Parameter | D | Load Impact Frequency | Impact Velocity | Impact Energy |
|---|---|---|---|---|---|
| Tool B | Y | 18.34 | 4300 | FIG. 10A | 3.59 J |
| Tool B1 | Y | 12.34 | 4300 | FIG. 10B | 3.65 J |
| Tool B2 | Y | 12.34 | 4700 | FIG. 10C | 4.3 J |

In Table 3, tool B1 and tool B2 are tools corresponding to different working parameters or component parameters after tool B is modified, separately. D is the minimum length of the gas space 44 along the output axis A; and the load impact frequency is the impact frequency at which the tool drills the workpiece. The tool common parameter may be one or more of the mass of the impact block, a swing angle of the swing link bearing, or the cylinder radius and may also be other parameters, which is not limited in the present application. The same tool common parameter is selected for tool B, tool B1, and tool B2 in Table 3 and is Y, and the value or type of Y is not described in detail herein.

As can be seen from the comparison of the second row with the third row in Table 3, when the impact frequency is relatively small and less than 4700 BPM and the distance D is shortened, the impact energy obtained by tool B1 is slightly higher than the impact energy obtained by the original tool B whose parameter is not modified. That is, with the impact frequency unchanged, the distance D is shortened so that the impact efficiency can be improved to some extent. As can be seen from the comparison of the third row with the fourth row in Table 3, on the basis of shortening the distance D, when the impact frequency increases to 4700 BPM, the impact energy and the impact efficiency can be greatly increased.

In the process of the hammer drill 1 in FIGS. 4 to 7 impacting a light load, the impact energy that can be obtained when the minimum length D of the gas space 44 along the output axis A or the impact frequency is changed is shown in Table 4.

Figure 11A:
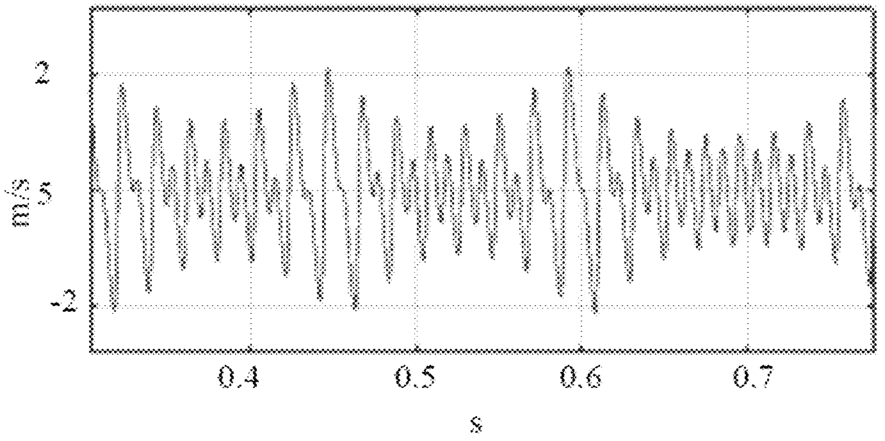
FIGS. 11A to 11C are impact velocity curves of an impact block in response to different parameter settings of the hammer drill shown in FIG. 4 working with a light load.

As shown in Table 4, when the tool has a light-load impact frequency of 5800 BPM, the velocity of the impact block 42 becomes very small as shown in FIG. 11A, and the impact dead point of the tool may occur. In this case, an increase of the impact frequency makes no sense. As shown in the third row of Table 4 and FIG. 11B, with the light-load impact frequency unchanged, the distance D is shortened so that the tool has a normal impact velocity and normal impact energy and can perform a normal impact without the impact dead point. As can be seen from the comparison of the second row with the third row of Table 4, when the light-load impact frequency is relatively high and reaches a critical value of the impact dead point, the distance D is shortened so that the tool can perform a normal impact. That is, the distance D is shortened so that the tool can reach a relatively high constant speed value when working at a constant speed or the tool can reach a relatively high impact frequency when working at a non-constant speed. As can be seen from the comparison of the third row with the fourth row of Table 4, when the distance D is shortened and the light-load impact frequency is increased, the tool can obtain relatively large impact energy and a relatively high impact velocity, thereby achieving relatively high impact efficiency.

TABLE 4

Figure 11B:
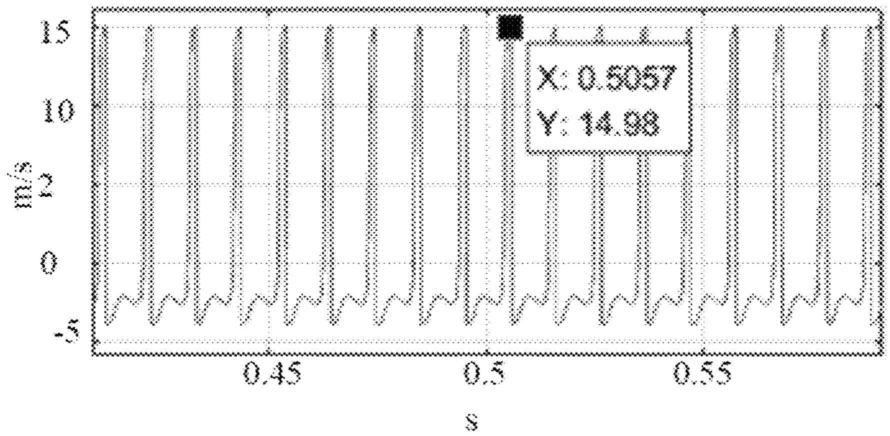
Figure 11C:
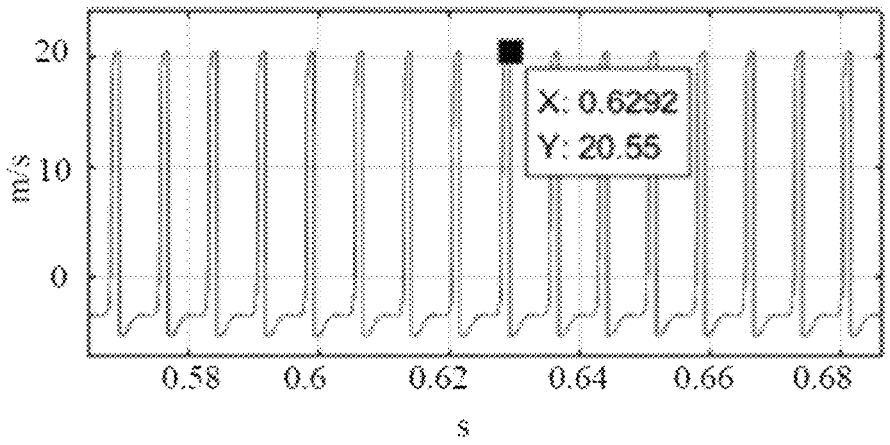

| Tool | Tool Common Parameter | D | Light-load Impact Frequency | Impact Velocity | Impact Energy |
|---|---|---|---|---|---|
| Tool B | Y | 18.34 | 5800 | FIG. 11A | Make no sense |
| Tool B1 | Y | 12.34 | 5800 | FIG. 11B | 6.52 J |
| Tool B2 | Y | 12.34 | 8000 | FIG. 11C | 12.26 J |

As can be seen from the comparison of Table 3 with Table 4, when the distance D is less than 13 mm, for example, 12.34 mm, the tool can reach a relatively high impact frequency to obtain relatively large impact energy and thus achieve relatively high impact efficiency.

The above illustrates and describes basic principles, main features, and advantages of the present disclosure. It is to be understood by those skilled in the art that the preceding examples do not limit the present disclosure in any form, and technical solutions obtained by means of equivalent substitutions or equivalent transformations fall within the scope of the present disclosure.

What is claimed is:

1. A hammer drill configured to perform a hammer drilling operation through a tip functional element, the hammer drill comprising:
- a motor;
- a drive mechanism for generating a driving force;
- an output mechanism for accommodating at least a portion of the tip functional element and capable of being driven by the drive mechanism to drive the tip functional element to rotate about an output axis, wherein the output axis extends along a front and rear direction of the hammer drill; and
- an impact mechanism capable of being driven by the drive mechanism to impact the tip functional element;
- wherein the impact mechanism comprises:
  - an impact rod capable of abutting against the tip functional element;
  - an impact power piece connected to the drive mechanism and used for generating impact power; and
  - an impact block disposed between the impact rod and the impact power piece and capable of reciprocating when impacted by the impact power generated by the impact power piece to impact the impact rod,
- wherein a gas space is formed between the impact block and the impact power piece and a minimum length of the gas space in a direction of the output axis is less than or equal to 13 mm, and
- wherein an impact frequency of the impact mechanism is greater than or equal to 4500 BPM.

2. The hammer drill of claim 1, wherein the impact power piece comprises a cylinder, the cylinder is a semi-closed cavity with an end open, a rear end of the cylinder is closed and connected to the drive mechanism and a front end of the cylinder is open and used for accommodating the impact block along the direction of the output axis, the impact block is partially or fully accommodated in the cylinder, and a rear end surface of the impact block and an inner wall of the cylinder are capable of forming the gas space.

3. The hammer drill of claim 1, wherein the output mechanism comprises a sleeve, the sleeve has a cylindrical cavity with two ends open, the impact power piece comprises a piston disposed within the sleeve and a connecting member, a front end of the connecting member is fixed to the piston and a rear end of the connecting member is connected to the drive mechanism, the impact block is accommodated within the sleeve, and a rear end surface of the impact block, an inner sidewall of the sleeve, and a front end surface of the piston are capable of forming the gas space.

4. The hammer drill of claim 1, wherein the minimum length of the gas space in the direction of the output axis is less than or equal to 10 mm.

5. The hammer drill of claim 1, wherein the minimum length of the gas space in the direction of the output axis is less than or equal to 11 mm.

6. The hammer drill of claim 1, wherein the minimum length of the gas space in the direction of the output axis is less than or equal to 12 mm.

7. The hammer drill of claim 1, wherein a weight of the impact block is greater than or equal to 50 g and less than or equal to 100 g.

8. The hammer drill of claim 1, wherein a weight of the impact block is greater than or equal to 50 g and less than or equal to 70 g.

9. The hammer drill of claim 1, wherein a length of the impact block is greater than or equal to 20 mm and less than or equal to 40 mm.

10. The hammer drill of claim 1, wherein a length of the impact block is greater than or equal to 25 mm and less than or equal to 30 mm.

11. The hammer drill of claim 1, wherein the hammer drill has an impact work of greater than or equal to 4.5 J.

12. The hammer drill of claim 1, wherein a weight of the hammer drill is less than or equal to 6 kg.

13. The hammer drill of claim 1, wherein a weight of the hammer drill is less than or equal to 4 kg.

14. A hammer drill configured to perform a tool operation through a tip functional element, wherein the tip functional element is mounted to the hammer drill in a mounting direction, the hammer drill comprising:
- a motor;
- an impact mechanism comprising an impact power piece for generating impact power and an impact block capable of reciprocating, wherein a gas space is provided between a rear end of the impact block and the impact power piece; and
- a drive mechanism capable of driving the impact mechanism,
- wherein a length of the gas space in the mounting direction is less than or equal to 13 mm when the impact block is at an impact position, and
- wherein an impact frequency of the impact mechanism is greater than or equal to 4500 BPM.

15. A power tool configured to perform a tool operation through a tip functional element, the power tool comprising:

a motor;

an impact mechanism capable of abutting against the tip functional element and capable of impacting the tip functional element along an output axis, wherein the output axis extends along a front and rear direction of the power tool; and a drive mechanism capable of driving the impact mechanism;

wherein the impact mechanism comprises:

an impact rod capable of abutting against the tip functional element;

an impact power piece connected to the drive mechanism and used for generating impact power; and an impact block disposed between the impact rod and the impact power piece, capable of forming a gas space with the impact power piece, and capable of reciprocating when impacted by the impact power generated by the impact power piece to reciprocatingly impact the impact rod, wherein a minimum length of the gas space in a direction of the output axis is less than or equal to 13 mm and an impact frequency of the impact mechanism is greater than or equal to 4500 BPM.

16. The power tool of claim 15, wherein the impact power piece comprises a cylinder, and the cylinder is a semi-closed cavity with an end open; wherein along the direction of the output axis, a rear end of the cylinder is closed and connected to the drive mechanism, and a front end of the cylinder is open and used for accommodating the impact block; and wherein the impact block is partially or fully accommodated in the cylinder, and a rear end surface of the impact block and an inner wall of the cylinder are capable of forming the gas space.

17. The power tool of claim 15, further comprising a sleeve, wherein the sleeve has a cylindrical cavity with two ends open, the impact power piece comprises a piston disposed within the sleeve, a rear end of the piston is connected to the drive mechanism, the impact block is accommodated within the sleeve, and a rear end surface of the impact block, an inner sidewall of the sleeve and a front end surface of the piston are capable of forming the gas space.

18. The power tool of claim 15, wherein the minimum length of the gas space in the direction of the output axis is less than or equal to 10 mm.

* * * * *